United States Patent
Ori et al.

(10) Patent No.: US 6,943,960 B2
(45) Date of Patent: Sep. 13, 2005

(54) THREE-GROUP ZOOM LENS INCLUDING AT LEAST ONE ASPHERIC LENS SURFACE

(75) Inventors: Tetsuya Ori, Koshigaya (JP); Ryoko Yamagami, Saitama (JP)

(73) Assignee: Fujinon Corporation, Saitama (JP)

(*) Notice: Subject to any disclaimer, the term of this patent is extended or adjusted under 35 U.S.C. 154(b) by 40 days.

(21) Appl. No.: 10/770,462

(22) Filed: Feb. 4, 2004

(65) Prior Publication Data

US 2004/0156121 A1 Aug. 12, 2004

(30) Foreign Application Priority Data

Feb. 6, 2003 (JP) ...................................... 2003-030116

(51) Int. Cl.[7] .............................................. G02B 15/14
(52) U.S. Cl. ....................... 359/684; 359/682; 359/685
(58) Field of Search ................................ 359/680, 682, 359/684, 685

(56) References Cited

U.S. PATENT DOCUMENTS

| | | | | |
|---|---|---|---|---|
| 6,351,337 B1 | * | 2/2002 | Tanaka | 359/684 |
| 6,661,584 B2 | | 12/2003 | Nishimura | 359/686 |
| 2005/0057816 A1 | * | 3/2005 | Sato | 359/676 |
| 2005/0057817 A1 | * | 3/2005 | Ori | 359/676 |
| 2005/0057818 A1 | * | 3/2005 | Sato | 359/680 |
| 2005/0057821 A1 | * | 3/2005 | Sato | 359/689 |

FOREIGN PATENT DOCUMENTS

JP     2000-284177     10/2000

* cited by examiner

*Primary Examiner*—David N. Spector
(74) *Attorney, Agent, or Firm*—Arnold International; Jon W. Henry; Bruce Y. Arnold (57) ABSTRACT

A three-group zoom lens includes first, second, and third lens groups, of negative, positive, and positive or negative refractive power, respectively. The second lens group includes a stop and the third lens group moves for focusing. When zooming from the wide-angle end to the telephoto end, the first and second lens groups become closer together. The zoom lens preferably satisfies specified conditions that ensure compactness, ease of manufacture, and favorable correction of aberrations. The zoom lens includes aspheric lens elements with lens surfaces defined by an aspheric lens equation that: (a) includes at least one non-zero coefficient of an even power of Y, and at least one non-zero coefficient of an odd power of Y, where Y is the distance of a point on the aspheric lens surface from the optical axis, and/or (b) includes at least one non-zero coefficient of $Y^i$, where i is even and 16 or greater.

14 Claims, 5 Drawing Sheets

Three-group zoom lenses that include, in order from the object side, a first lens group of negative refractive power, a second lens group of positive refractive power, and a third lens group for use in cameras are known in the prior art. These three-group zoom lenses have become widely used because they are compact and provide favorable correction of aberrations.

Recently, digital cameras and video cameras have rapidly become popular, and these cameras are advantageously small and capable of providing high image quality with small aberrations, including distortion, characteristics similarly desired for previous types of cameras. On the other hand, conditions related to the use of solid state image pickup elements, such as CCD's, must be satisfied that do not pertain to the previous types of cameras.

Auto-focus is almost essential in digital cameras and video cameras and faster focusing is desired in such cameras. Therefore, inner focusing or rear focusing that reduces the weight of the moving lens elements, assures the moving lens elements are close to the camera body, and allows easy driving of the lens elements is frequently used as the focusing mode in zoom lenses for such cameras. For example, Japanese Laid-Open Patent Application 2000-284177 discloses a rear focusing zoom lens for achieving rapid focusing and that provides high resolution images having improved aberration correction.

The desired high image quality and small size of digital cameras and video cameras has led to reducing the pixel size (i.e., area per pixel) of the CCD of the image pickup element. As the pixel size is decreased, greater correction of spherical aberration is demanded in order to achieve the higher resolution required of the zoom lens by reducing the pixel size. However, while the zoom lens described in the above-mentioned Japanese application provides favorable correction of distortion and curvature of field, it is difficult to simultaneously reduce the spherical aberration the desired amount. If plural aspheric lenses are used in the first lens group, which is one approach to solving the problem, distortion, curvature of field and spherical aberration can be simultaneously favorably corrected, but the zoom lens tends to become too large and too expensive to manufacture.

BRIEF SUMMARY OF THE INVENTION

The present invention relates to a three-group zoom lens that can simultaneously favorably correct distortion, curvature of field, and spherical aberration and provides high resolution while being compact and relatively inexpensive to manufacture. More specifically, the present invention relates to a three-group zoom lens that includes at least one aspheric lens element, is suitable for use in a digital camera or video camera having a solid state image pickup element, and has a zoom ratio of about 3 while maintaining a short overall length of the optical system and providing favorable correction of aberrations.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
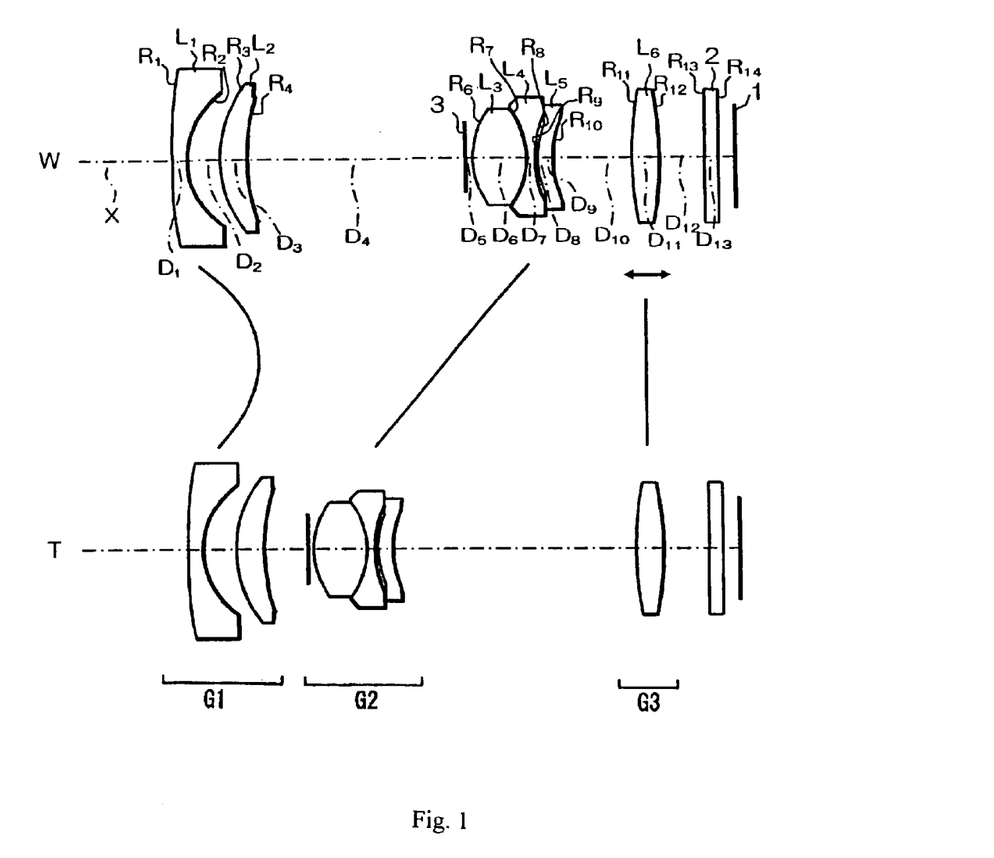
FIG. 1 shows cross-sectional views of the zoom lens according to Embodiment 1 at the wide-angle end W and the telephoto end T.

A general description of the three-group zoom lens of the present invention that pertains to all three embodiments of the invention will first be described with reference to FIG. 1 that shows Embodiment 1. In FIG. 1, lens elements are referenced by the letter L with a subscript denoting their order from the object side of the zoom lens along the optical axis X, from $L_1$ to $L_6$. Similarly, radii of curvature of the surfaces of various optical elements, including the lens surfaces, are referenced by the letter R with a subscript denoting their order from the object side of the zoom lens, from $R_1$ to $R_{14}$. The on-axis surface spacings along the optical axis X of various optical surfaces are referenced by the letter D with a subscript denoting their order from the object side of the zoom lens, from $D_1$ to $D_{13}$. In the same manner, the three lens groups are labeled G1 through G3 in order from the object side of the zoom lens.

The term "lens group" is defined in terms of "lens elements" and "lens components" as explained herein. The term "lens element" is herein defined as a single transparent mass of refractive material having two opposed refracting surfaces that are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit relative to other lens groups.

As shown in FIG. 1, a diaphragm stop 3 that controls the amount of light that passes through the zoom lens is included as part of the second lens group G2. An image pickup device, such as a CCD (not shown), is arranged at the image plane 1. Additionally, a low-pass filter or an infrared blocking filter 2 is arranged between the third lens group G3 and the image plane 1.

As shown in FIG. 1, the zoom lens of the present invention includes, in order from the object side, a first lens group G1 of negative refractive power, a second lens group G2 of positive refractive power, and a third lens group G3 of positive or negative refractive power. The first lens group G1 and the second lens group G2 are moved relative to one another during zooming from the wide-angle end to the telephoto end so as to reduce the distance between the two lens groups G1 and G2. The first lens group G1 includes at least one aspheric lens surface.

Additionally, all the aspheric lens surfaces of the zoom lens satisfy the following equation:

$$Z=[(Y^2/R)/\{1+(1-K\cdot Y^2/R^2)^{1/2}\}]+\Sigma A i|Y^i| \qquad \text{(Equation A)}$$

where

Z is the length (in mm) of a line drawn from a point on the aspheric surface at a distance Y from the optical axis to the tangential plane of the aspheric surface vertex, R is the radius of curvature (in mm) of the aspheric surface on the optical axis, Y is the distance (in mm) from the optical axis, K is the eccentricity of the aspheric lens surface, and $A_i$ is the ith aspheric coefficient and the summation extends over i equals one to twenty.

It has been known to prescribe the shape of aspheric lens surfaces using the above Equation (A) with the aspheric coefficients $A_4$, $A_6$, $A_8$, $A_{10}$ and $A_{12}$ being non-zero (see, for example, U.S. Pat. No. 6,661,584 B2). If, in attempting to improve lens performance, the number of non-zero aspheric coefficients was increased by including non-zero coefficients for, for example $A_{14}$, $A_{16}$, etc., the optical design software and lens processing programming has conventionally been considered to be too complicated to be practical using available computers.

In contrast, the zoom lens of the present invention may prescribe the shape of an aspheric surface not only in conventional terms of aspheric coefficients with low even numbered subscripts being non-zero in Equation (A) above, but also in terms of aspheric coefficients with low odd numbered subscripts being non-zero in accordance with the recent demand for higher resolution optical systems and improvements in computer performance. By using aspheric coefficients with both even and odd subscripts being non-zero in Equation (A) above, both even and odd powers of Y help determine the shape of the aspheric lens surface. In particular, at least one lens element of the first lens group G1 may include an aspheric lens surface according to Equation (A) using aspheric coefficients having both even and odd subscripts that are non-zero so that both even and odd powers of Y help determine the shape of the at least one aspheric lens surface. The shape of the central lens surface area including the optical axis and the shape of an area outside this central area (hereinafter called the peripheral area) of the aspheric lens surface can be independently determined to some extent by increasing the parameters of Equation (A) that determine the aspheric shape to include non-zero aspheric coefficients with odd numbered subscripts.

Generally in a three-group zoom lens having an aspheric lens surface in the first lens group G1, the aspheric lens surface is designed to favorably correct the curvature of field and distortion because the peripheral areas extend far from the central area in this lens group. Thus, the shape of the central area that primarily affects the spherical aberration can be independently determined to some extent while maintaining the shape of the peripheral area for improving such curvature of field and distortion. Thus, spherical aberration, distortion and curvature of field can be simultaneously favorably corrected.

As the number of terms used in Equation (A) increases, the optical performance generally improves. However, using more terms increases the difficulty of designing and manufacturing the lens systems, thereby increasing costs, which must be balanced against any improvement in optical performance. For example, an acceptable correction of aberrations may be obtained by adding parameters that contribute to the determination of the shape of the central area even if only one term of the odd numbered power three of Y is added to the terms of the even numbered powers four, six, eight, and ten, generally used previously. As another example, when Equation (A) is provided with aspheric coefficients $A_4$ through $A_{10}$ that are non-zero, the shape of the central area may appropriately correct spherical aberration based on the lower power terms, and the shape of the peripheral area may appropriately correct curvature of field and distortion based on the higher power terms.

Alternatively or additionally, in the zoom lens of the present invention with the lens group arrangement as described above, including the first lens group G1 with an aspheric lens, Equation (A) may prescribe an aspheric lens surface in terms of aspheric coefficients with subscripts smaller than sixteen that are non-zero and aspheric coefficients with subscripts of sixteen or larger that are non-zero so that powers of Y of sixteen or larger help determine the shape of an aspheric lens surface.

Thus, two techniques are disclosed for defining the aspheric shape of a lens surface according to Equation (A) above, each technique being usable separately or in conjunction with the other technique: (1) using aspheric coefficients with both even and odd subscripts that are non-zero so that both even and odd powers of Y help determine the shape of the aspheric lens surface according to Equation (A) above, and (2) using aspheric coefficients with subscripts of sixteen or larger that are non-zero so that powers of Y of sixteen or larger help determine the shape of the aspheric lens surface according to Equation (A) above.

In the first case, the parameters determining the shape of an aspheric surface are increased by using terms in Equation (A) above with aspheric coefficients having low odd-numbered subscripts that are non-zero that add to the terms with aspheric coefficients having low even-numbered subscripts that are non-zero. In the second case, the parameters are increased by using terms with aspheric coefficients having subscripts of sixteen or larger that are non-zero, along with terms with aspheric coefficients having subscripts smaller than sixteen that are non-zero as known previously. In both cases, similar corrections of aberrations can be achieved, and the shape of the central area including the optical axis and the shape of the peripheral area of the aspheric lens surface can be independently determined to some extent so that the shape of the central area can be determined for correcting spherical aberration based on the lower power terms. Simultaneously, the shape of the peripheral area can be determined for correcting curvature of field and distortion based on the higher power terms. Thus, spherical aberration, distortion and curvature of field can be simultaneously favorably corrected in a similar manner in both cases.

Furthermore, the two techniques may be used together. That is, using Equation (A) above, terms with aspheric coefficients having low odd-numbered subscripts that are non-zero and with aspheric coefficients having subscripts of sixteen or larger that are non-zero may both be added to conventional applications of Equation (A).

Embodiments 1–3 of the present inventions will now be individually described with further reference to the drawings. In the following descriptions, references will be frequently made to a "lens element." However, as set forth above, it is understood that numerous of the lens elements described below are also lens components and may be replaced by lens components that include more than one lens element. Additionally, although Embodiments 1–3 that follow are specifically disclosed using a particular one of the techniques of (a) using aspheric coefficients having both even and odd subscripts that are non-zero so that both even and odd powers of Y help determine the shape of the at least one aspheric lens surface according to Equation (A) above, or (b) using aspheric coefficients having subscripts of sixteen or larger that are non-zero so that powers of Y of sixteen or larger help determine the shape of the at least one aspheric lens surface according to Equation (A) above, any of Embodiments 1–3 described below could easily be modified to use the other technique or to use both techniques in order to improve the imaging.

Embodiment 1

In Embodiment 1, as shown in FIG. 1, the three-group zoom lens includes, in order from the object side, a first lens group G1 of negative refractive power, a second lens group G2 of positive refractive power, and a third lens group G3 of positive refractive power. The first lens group G1 and the second lens group G2 are moved relative to one another during zooming from the wide-angle end to the telephoto end so as to reduce the distance between the two lens groups, and the second lens group G2 and the third lens group G3 are moved relative to one another during zooming from the wide-angle end to the telephoto end so as to increase the distance between these two lens groups. Additionally, the third lens group G3 is moved toward the object side during focusing from a focus at infinity to a near point focus. In this manner, the three-group zoom lens of Embodiment 1 provides changes in focal length by moving the three lens groups along the optical axis X while maintaining high light transmission to a focused image at the imaging plane 1.

The first lens group G1 includes, in order from the object side, a first lens element $L_1$ of negative refractive power and a meniscus shape with its concave lens surface on the image side and a second lens element $L_2$ of positive refractive power and a meniscus shape with its convex lens surface on the object side. Both lens surfaces of the first lens element $L_1$ are aspheric, and the aspheric shapes are prescribed by Equation (A) above with aspheric coefficients with both even and odd numbered subscripts being non-zero. Thus, both even and odd powers of Y help determine the shape of the aspheric lens surfaces of the first lens element $L_1$.

The second lens group G2 includes, in order from the object side, a diaphragm stop 3, a lens component formed of a third lens element $L_3$ having a biconvex lens shape with the same curvature on both lens element surfaces, and a fourth lens element $L_4$ having a biconcave shape with its lens surface of greater curvature on the object side and that is intimately bonded to the third lens element $L_3$, and a fifth lens element $L_5$ of positive refractive power and a meniscus shape with its convex lens surface on the object side. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together, the latter being commonly referred to as a "cemented" lens element arrangement.

Both lens surfaces of the fifth lens element $L_5$ are aspheric, and the aspheric shapes are prescribed by Equation (A) above, but only aspheric coefficients with even numbered subscripts are non-zero. Thus, in Embodiment 1, only even powers of Y help determine the shape of the aspheric lens surfaces of the fifth lens element $L_5$.

The third lens group G3 is formed of a sixth lens element $L_6$ having a biconvex shape with both lens surfaces having the same curvature.

By using lens elements of prescribed shapes and including aspheric lens elements $L_1$ and $L_5$ as described above, the three-group zoom lens of Embodiment 1 achieves high resolution with good aberration correction while maintaining a compact six lens element construction.

Preferably, the first aspheric lens element on the object side is not only in lens group G1 but is also positioned as far from the diaphragm stop 3 as possible. Specifically, in Embodiment 1 this is done by choosing lens element $L_1$ as an aspheric lens element with two aspheric lens surfaces designed according to the technique described above of using aspheric coefficients with both even and odd subscripts being non-zero so that both even and odd powers of Y help determine the shape of the aspheric lens surfaces according to Equation (A) above. Because the peripheral areas of the lens elements extend far from the central area in this lens group, substantial simultaneous correction of spherical aberration, distortion and curvature of field is possible.

Preferably, the three-group zoom lens satisfies the following conditions:

$$d/fw < 0.15 \quad \text{Condition (1)}$$

$$vL_3 - vL_4 > 15 \quad \text{Condition (2)}$$

where d is the on-axis spacing between the image-side lens surface of the biconcave lens element in the second lens group and the lens element having positive refractive power and a meniscus shape in the second lens group;

fw is the focal length of the three-group zoom lens at the wide-angle end;

$vL_3$ is the Abbe number of the biconvex lens element of the second lens group, and $vL_4$ is the Abbe number of the biconcave lens element of the second lens group.

Satisfying Condition (1) helps reduce the overall thickness of the second lens group G2. Thus, by choosing lens element $L_1$ as an aspheric lens element with two aspheric lens surfaces designed according to the technique described above of using aspheric coefficients with both even and odd subscripts that are non-zero so that both even and odd powers of Y help determine the shape of the aspheric lens surfaces according to Equation (A) above, the zoom lens can be made compact. Satisfying Condition (2) helps correct lateral color at the wide-angle end and axial chromatic aberration at the telephoto end.

When Condition (1) is satisfied, it is preferable, as shown in FIG. 1, that an image-side edge portion of the fourth lens element $L_4$ and an object-side edge portion of the fifth lens element $L_5$ in the second lens group G2 include flat surfaces that contact each other. This reduces the labor and time for adjusting and aligning the lenses of the second lens group G2, including the fifth lens $L_5$ which is an aspheric lens, and improves assembly accuracy, such as that related to eccentric positioning of lens elements, that may cause deterioration of image quality and prevent high resolution imaging. Alternatively, high resolution imaging is similarly obtained when each of an image-side edge portion of the fourth lens element $L_4$ and an object-side edge portion of the fifth lens element $L_5$ includes a flat surface, and the flat surfaces are parallel and in contact with one of two opposite parallel sides of a plate, thus sandwiching the plate between the flat surfaces of the lens elements.

Because in the three-group zoom lens of Embodiment 1 the third lens group G3 is fixed at a predetermined reference position corresponding to a particular focus position, for example—infinity, when the zoom lens is retracted, the focusing operation is easily achieved by an actuator, such as a motor, and the retracted length of the zoom lens may be made very short. Additionally, by using intimately bonded lens elements in the second lens group G2, the second lens group G2 is made thinner, which also contributes to a shorter overall length of the three-group zoom lens of Embodiment 1 in the retracted position.

Table 1 below lists the surface number #, in order from the object side, the radius of curvature R (in mm) of each surface near the optical axis, the on-axis surface spacing D (in mm) between surfaces, as well as the refractive index $N_d$ and the Abbe number $\nu_d$ (both at the d-line of 587.6 nm) of each lens element for Embodiment 1. Listed in the bottom portion of Table 1 are the focal length f and the f-number $F_{NO}$ at the wide-angle and telephoto ends, and the maximum field angle $2\omega$ at the wide-angle end and the telephoto end for Embodiment 1.

TABLE 1 f = 5.8–15.96 mm $F_{NO}$ = 2.9–5.0 $2\omega$ = 62.3°–23.7°

| # | R | D | $N_d$ | $\nu_d$ |
|---|---|---|---|---|
| 1* | 289.1745 | 1.00 | 1.80348 | 40.4 |
| 2* | 5.6490 | 2.16 | | |
| 3 | 8.1430 | 1.83 | 1.92286 | 20.9 |
| 4 | 13.5774 | $D_4$ (variable) | | |
| 5 | ∞ (stop) | 0.40 | | |
| 6 | 5.5720 | 3.54 | 1.71300 | 53.9 ($\nu L_3$) |
| 7 | −5.5720 | 0.56 | 1.66680 | 33.1 ($\nu L_4$) |
| 8 | 7.1924 | 0.15 | | |
| 9* | 5.7845 | 1.05 | 1.56865 | 58.6 |
| 10* | 7.6893 | $D_{10}$ (variable) | | |
| 11 | 24.9237 | 1.81 | 1.48749 | 70.2 |
| 12 | −24.9237 | 4.05 | | |
| 13 | ∞ | 0.91 | 1.51680 | 64.2 |
| 14 | ∞ | | | |

The lens surfaces with a * to the right of the surface number in Table 1 are aspheric lens surfaces, and the aspheric surface shape of these lens elements is expressed by Equation (A) above.

Table 2 below lists the values of the constants K and $A_3$–$A_{10}$ used in Equation (A) above for each of the aspheric lens surfaces (#1 and #2) of lens element $L_1$ of Table 1. Table 3 below lists the values of the constants K, $A_4$, $A_6$, $A_8$, and $A_{10}$ used in Equation (A) above for each of the aspheric lens surfaces (#9 and #10) of lens element $L_5$ of Table 1. Aspheric coefficients that are not present in Tables 2 and 3 are zero. An "E" in the data indicates that the number following the "E" is the exponent to the base 10. For example, "1.0E-2" represents the number $1.0 \times 10^{-2}$.

TABLE 2

| Aspheric Factor | #1 | #2 |
|---|---|---|
| K | −1.6541660 | −0.2646114 |
| $A_3$ | −1.7066764E−4 | −3.6236190E−4 |
| $A_4$ | 2.0859084E−3 | 3.2772158E−3 |
| $A_5$ | −5.2991230E−4 | −7.3500188E−4 |
| $A_6$ | −2.8005201E−5 | 1.7210526E−5 |
| $A_7$ | 3.2753797E−5 | 2.4496153E−5 |
| $A_8$ | −4.7044463E−6 | −5.6434100E−7 |
| $A_9$ | 1.2466006E−7 | −6.9394753E−7 |
| $A_{10}$ | 1.1261201E−8 | 6.0890837E−8 |

TABLE 3

| # | K | $A_4$ | $A_6$ | $A_8$ | $A_{10}$ |
|---|---|---|---|---|---|
| 9 | −3.9999935 | 3.3683977E−3 | −1.9741958E−4 | −1.4767677E−5 | −1.6776015E−7 |
| 10 | 0.1092475 | 3.6796439E−3 | 3.3159871E−5 | −1.8135579E−5 | −1.4023255E−7 |

In the zoom lens of Embodiment 1, lens groups G1 and G2 move to vary their separations and the separation of lens group G2 from lens group G3 also changes during zooming. Therefore, the values of the on-axis spacings $D_4$ and $D_{10}$ vary. Table 4 below lists the values of the variables $D_4$ and $D_{10}$ (i.e., the on-axis spacings) at the wide-angle end (Wide), at an intermediate position, and at the telephoto end (Tele). The focal length of the zoom lens when focused at is 5.80 mm at the wide-angle end, 9.63 mm at an intermediate position, and 15.96 mm at the telephoto end.

TABLE 4

| # | Wide | Intermediate | Tele |
|---|---|---|---|
| $D_4$ | 14.56 | 7.24 | 2.84 |
| $D_{10}$ | 5.28 | 9.40 | 16.19 |

The zoom lens of Embodiment 1 of the present invention satisfies both Conditions (1) and (2) above as set forth in Table 5 below.

TABLE 5

| Condition No. | Condition | Value |
|---|---|---|
| (1) | $d/f_w < 0.15$ | 0.026 |
| (2) | $\nu L_3 − \nu L_4 > 15$ | 20.8 |

Figure 3A:
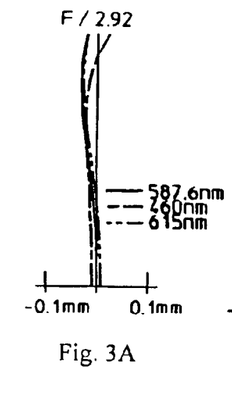
FIGS. 3A–3D show aberrations of the zoom lens according to Embodiment 1 at the wide-angle end.
Figure 3B:
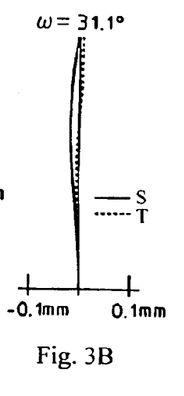
Figure 3C:
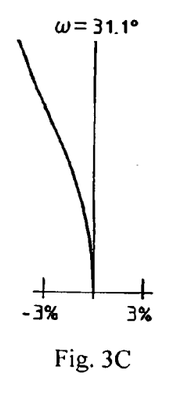
Figure 3D:
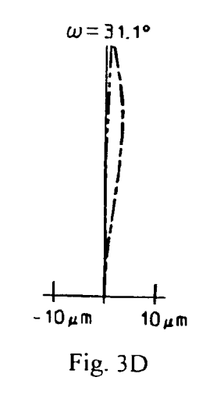
Figure 3E:
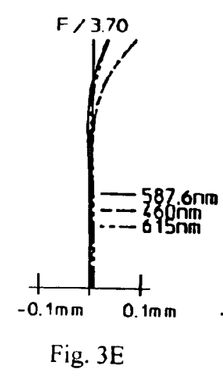
FIGS. 3E–3H show aberrations of the zoom lens according to Embodiment 1 at an intermediate position.
Figure 3F:
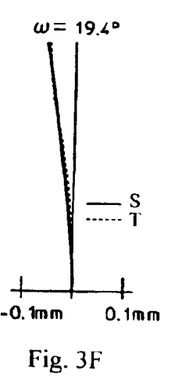
Figure 3G:
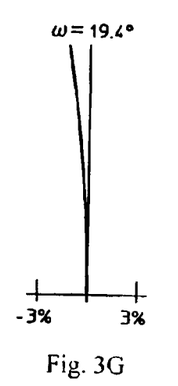
Figure 3H:
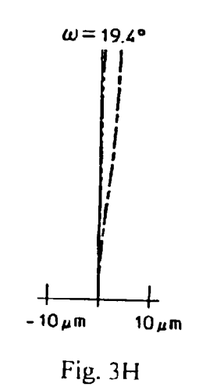
Figure 3I:
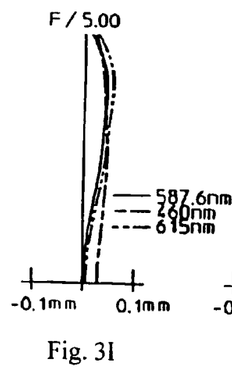
FIGS. 3I–3L show aberrations of the zoom lens according to Embodiment 1 at the telephoto end.
Figure 3J:
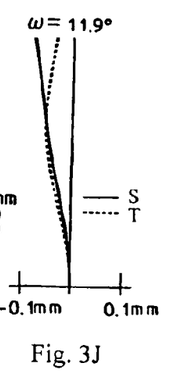
Figure 3K:
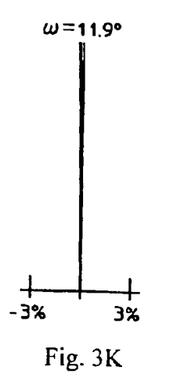
Figure 3L:
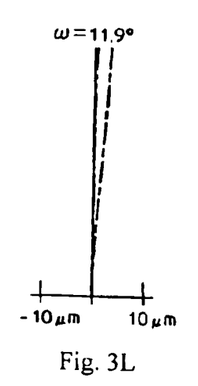

FIGS. 3A–3D show the spherical aberration, astigmatism, distortion, and lateral color, respectively, of the zoom lens of Embodiment 1 at the wide-angle end. FIGS. 3E–3H show the spherical aberration, astigmatism, distortion, and lateral color, respectively, of the zoom lens of Embodiment 1 at an intermediate position, and FIGS. 3I–3L show the spherical aberration, astigmatism, distortion, and lateral color, respectively, of the zoom lens of Embodiment 1 at the telephoto end. In FIGS. 3A, 3E, and 3I, the spherical aberration is shown for the wavelengths 587.6 nm (the d-line), 460.0 nm, and 615.0 nm. In the remaining figures, $\omega$ is the half-field angle. In FIGS. 3B, 3F and 3J, the astigmatism is shown for the sagittal image surface S and the tangential image surface T. In FIGS. 3C, 3G and 3K, distortion is measured at 587.6 nm (the d-line). In FIGS. 3D, 3H and 3L, the lateral color is shown for the wavelengths 460.0 nm and 615.0 nm relative to 587.6 nm (the d-line). As is apparent from these figures, the various aberrations are favorably corrected over the entire range of zoom.

Embodiment 2

Embodiment 2 is very similar to Embodiment 1 and therefore only the differences between Embodiment 2 and Embodiment 1 will be explained. A main difference from Embodiment 1 is that the shape of some of the aspheric surfaces are prescribed by the above Equation (A) in terms of aspheric coefficients with even numbered subscripts of sixteen or larger being non-zero as well as aspheric coefficients with even numbered subscripts smaller than sixteen being non-zero. Thus, even-numbered powers of Y of sixteen or larger, as well as even-numbered powers of Y smaller than sixteen, help determine the shape of some of the aspheric lens surfaces. In other words, in Embodiment 2, both lens surfaces of the first lens element $L_1$ are prescribed by the above Equation (A) in terms of aspheric coefficients, with the even-numbered coefficients having subscripts of sixteen or larger being non-zero, as well as the even-numbered coefficients having subscripts smaller than sixteen being non-zero.

Additionally, in Embodiment 2, the sixth lens element $L_6$ that forms the third lens group G3 has a biconvex lens shape with its lens surface of greater curvature on the object side.

By using aspheric lens surfaces defined using Equation (A) in the first lens element $L_1$ and the fifth lens element $L_5$ as described above, the three-group zoom lens of Embodiment 2 achieves high resolution and favorable aberration correction while maintaining a compact six lens element arrangement, including a short extension of the zoom lens in a retracted position in a camera body.

Embodiment 2 also differs from Embodiment 1 in its lens element configuration by different radii of curvature of lens surfaces, different eccentricities and aspheric coefficients of the aspheric lens surfaces, and some different optical element surface spacings.

Table 6 below lists the surface number #, in order from the object side, the radius of curvature R (in mm) of each surface near the optical axis, the on-axis surface spacing D (in mm) between surfaces, as well as the refractive index $N_d$ and the Abbe number $\nu_d$ (both at the d-line of 587.6 nm) of each lens element for Embodiment 2. Listed in the bottom portion of Table 6 are the focal length f and the f-number $F_{NO}$ at the wide-angle and telephoto ends, and the maximum field angle $2\omega$ at the wide-angle end and the telephoto end for Embodiment 2.

TABLE 6 f = 5.81–15.98 mm $F_{NO}$ = 2.9–5.0 $2\omega$ = 62.3°–23.7°

| # | R | D | $N_d$ | $\nu_d$ |
|---|---|---|---|---|
| 1* | 407.8429 | 1.00 | 1.80348 | 40.4 |
| 2* | 5.7054 | 2.19 | | |
| 3 | 8.2507 | 1.81 | 1.92286 | 20.9 |
| 4 | 13.8073 | $D_4$ (variable) | | |
| 5 | ∞ (stop) | 0.40 | | |
| 6 | 5.4784 | 3.57 | 1.71300 | 53.9 ($\nu L_3$) |
| 7 | −5.4784 | 0.56 | 1.66680 | 33.1 ($\nu L_4$) |
| 8 | 7.1924 | 0.15 | | |
| 9* | 6.0289 | 1.05 | 1.50869 | 56.0 |
| 10* | 8.1296 | $D_{10}$ (variable) | | |
| 11 | 19.8035 | 1.77 | 1.48749 | 70.2 |
| 12 | −34.6993 | 3.92 | | |
| 13 | ∞ | 0.91 | 1.51680 | 64.2 |
| 14 | ∞ | | | |

The lens surfaces with a * to the right of the surface number in Table 6 are aspheric lens surfaces, and the aspheric surface shape of these lens elements is expressed by Equation (A) above.

Table 7 below lists the values of the constants K and $A_4$, $A_6$, $A_8$, $A_{10}$, $A_{12}$, $A_{14}$, $A_{16}$, $A_{18}$, and $A_{20}$ used in Equation (A) above for each of the aspheric lens surfaces (#1 and #2) of lens element $L_1$ of Table 6. Table 8 below lists the values of the constants K, $A_4$, $A_6$, $A_8$, and $A_{10}$ used in Equation (A) above for each of the aspheric lens surfaces (#9 and #10) of lens element $L_5$ of Table 6. Aspheric coefficients that are not present in Tables 7 and 8 are zero. An "E" in the data indicates that the number following the "E" is the exponent to the base 10. For example, "1.0E-2" represents the number $1.0 \times 10^{-2}$.

TABLE 7

| Aspheric Factor | #1 | #2 |
|---|---|---|
| K | 0 | 0 |
| $A_4$ | 1.7110893E−3 | 2.5780279E−3 |
| $A_6$ | −2.0909876E−4 | −3.1798526E−4 |
| $A_8$ | 2.0190176E−5 | 4.6615960E−5 |
| $A_{10}$ | −1.3971824E−6 | −5.2321154E−6 |
| $A_{12}$ | 6.7534263E−8 | 4.3261277E−7 |
| $A_{14}$ | −2.2008009E−9 | −2.4552167E−8 |
| $A_{16}$ | 4.5660836E−11 | 8.9191847E−10 |
| $A_{18}$ | −5.4152607E−13 | −1.8582400E−11 |
| $A_{20}$ | 2.7882919E−15 | 1.6845886E−13 |

TABLE 8

| # | K | $A_4$ | $A_6$ | $A_8$ | $A_{10}$ |
|---|---|---|---|---|---|
| 9 | −5.0453318 | 2.9793278E−3 | −2.7004844E−4 | −1.5257602E−5 | −1.7165122E−7 |
| 10 | 0.0028545 | 3.3602408E−3 | 1.0036066E−5 | −1.7692234E−5 | −1.3898743E−7 |

In the zoom lens of Embodiment 2, lens groups G1 and G2 move to vary their separations and the separation of lens group G2 from lens group G3 also changes during zooming.

Therefore, the values of the on-axis spacings $D_4$ and $D_{10}$ vary. Table 9 below lists the values of the variables $D_4$ and $D_{10}$ (i.e., the on-axis spacings) at the wide-angle end (Wide), at an intermediate position, and at the telephoto end (Tele). The focal length of the zoom lens when focused at infinity is 5.81 mm at the wide-angle end, 9.64 mm at an intermediate position, and 15.98 mm at the telephoto end.

TABLE 9

| # | Wide | Intermediate | Tele |
|---|---|---|---|
| $D_4$ | 14.59 | 7.24 | 2.83 |
| $D_{10}$ | 5.38 | 9.48 | 16.26 |

The zoom lens of Embodiment 2 of the present invention satisfies both Conditions (1) and (2) above as set forth in Table 10 below.

TABLE 10

| Condition No. | Condition | Value |
|---|---|---|
| (1) | $d/f_w < 0.15$ | 0.026 |
| (2) | $vL_3 - vL_4 > 15$ | 20.8 |

Figures 4A, 4B:
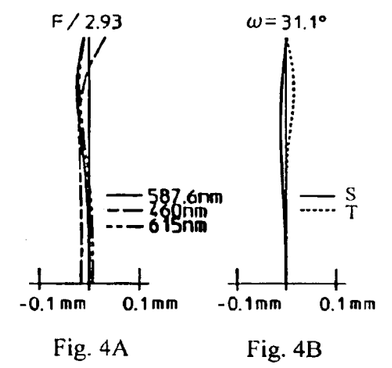
FIGS. 4A–4D show aberrations of the zoom lens according to Embodiment 2 at the wide-angle end.
Figure 4C:
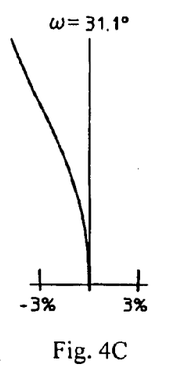
Figure 4D:
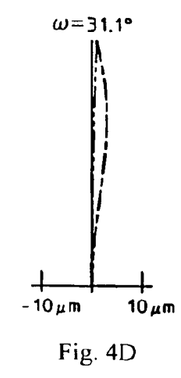
Figures 4E, 4F:
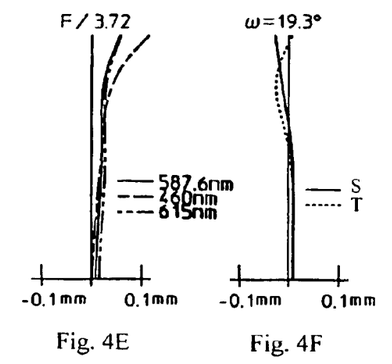
FIGS. 4E–4H show aberrations of the zoom lens according to Embodiment 2 at an intermediate position.
Figure 4G:
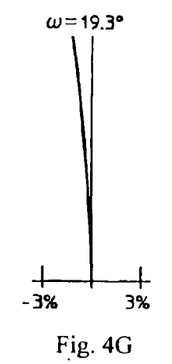
Figure 4H:
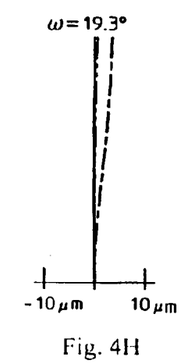
Figures 4I, 4J:
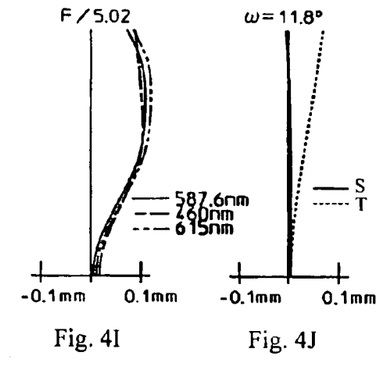
FIGS. 4I–4L show aberrations of the zoom lens according to Embodiment 2 at the telephoto end.
Figure 4K:
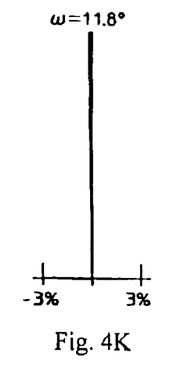
Figure 4L:
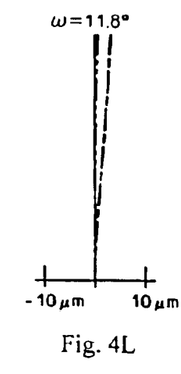

FIGS. 4A–4D show the spherical aberration, astigmatism, distortion, and lateral color, respectively, of the zoom lens of Embodiment 2 at the wide-angle end. FIGS. 4E–4H show the spherical aberration, astigmatism, distortion, and lateral color, respectively, of the zoom lens of Embodiment 2 at an intermediate position, and FIGS. 4I–4L show the spherical aberration, astigmatism, distortion, and lateral color, re+spectively, of the zoom lens of Embodiment 2 at the telephoto end. In FIGS. 4A, 4E, and 4I, the spherical aberration is shown for the wavelengths 587.6 nm (the d-line), 460.0 nm, and 615.0 nm. In the remaining figures, ω is the half-field angle. In FIGS. 4B, 4F and 4J, the astigmatism is shown for the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 460.0 nm and 615.0 nm relative to 587.6 nm (the d-line). As is apparent from these figures, the various aberrations are favorably corrected over the entire range of zoom.

Embodiment 3

Figure 2:
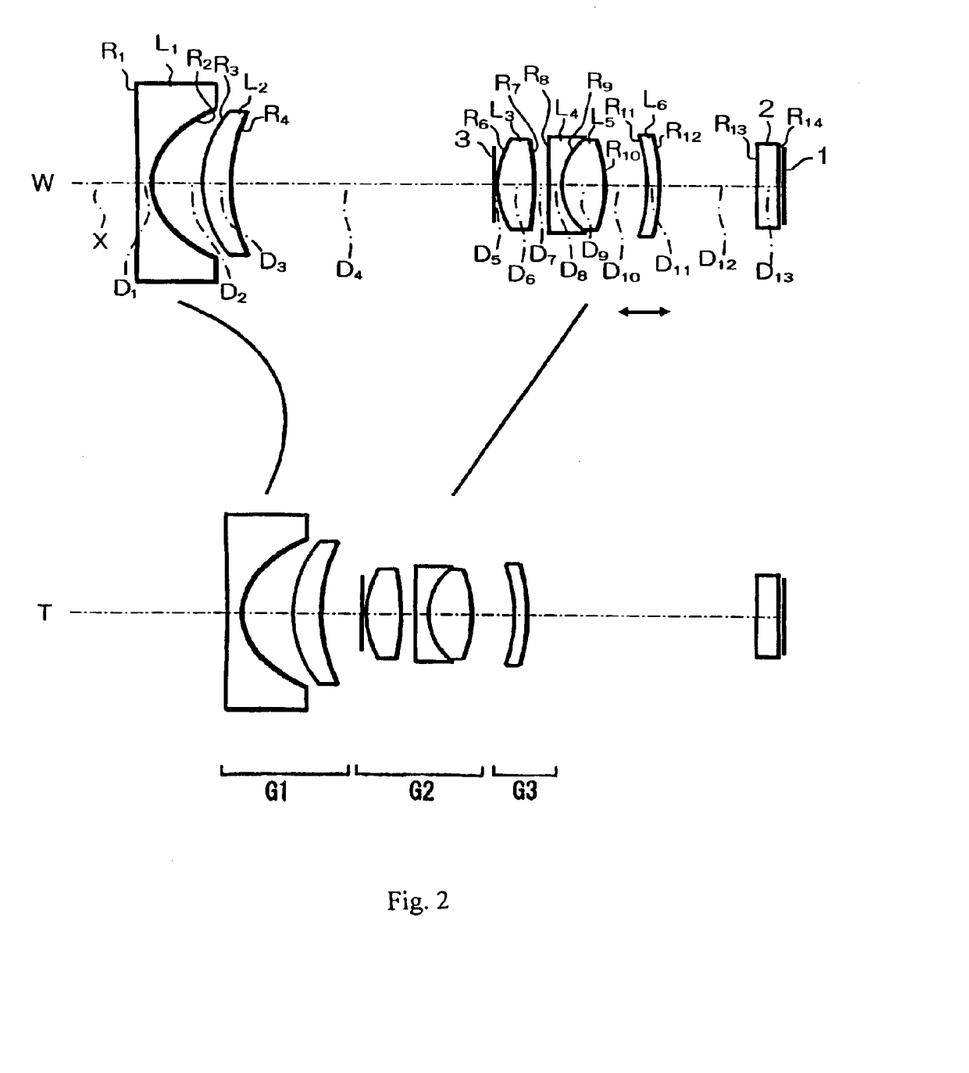
FIG. 2 shows cross-sectional views of the zoom lens according to Embodiment 3 at the wide-angle end W and the telephoto end T.

Embodiment 3 is similar to Embodiment 1 and therefore only the differences between Embodiment 3 and Embodiment 1 will be explained. As shown in FIG. 2, the three-group zoom lens of Embodiment 3 includes, in order from the object side, a first lens group G1 having negative refractive power, a second lens group G2 having positive refractive power, and a third lens group G3 having negative refractive power. The first lens group G1 and the second lens group G2 are moved during zooming from the wide-angle end to the telephoto end so as to reduce the distance between these two lens groups, and the second lens group G2 and the third lens group G3 are moved so as to maintain a constant distance between these two lens groups at the time of zooming from the wide-angle end to the telephoto end. Thus, the lens frames of lens groups G2 and G3 can be constructed on a unified frame, simplifying the design, construction, and operation of the three-group zoom lens. The third lens group G3 is separately moved to the object side at the time of focusing from infinity to the near point.

In this manner, the three-group zoom lens of Embodiment 3 provides changes in focal length by moving the three lens groups along the optical axis X while maintaining high light transmission to a focused image at the imaging plane 1.

The first lens group G1 includes, in order from the object side: a first lens element $L_1$ of negative refractive power and a biconcave shape having lens surfaces of different curvature, and with the lens surface of greater curvature on the image side; and, a second lens element $L_2$ having positive refractive power and a meniscus shape with its convex lens surface on the object side. Both lens surfaces of the first lens element $L_1$ are aspheric, and the aspheric shapes are prescribed by Equation (A) above with aspheric coefficients that are non-zero for both even-numbered and odd-numbered values of the subscript i. Thus, both even and odd powers of Y help determine the shape of the aspheric lens surfaces of the first lens element $L_1$.

The second lens group G2 includes, in order from the object side, a diaphragm stop 3, a lens component formed of a third lens element $L_3$ having a biconvex lens shape with its lens surface of greater curvature on the object side, a combined lens component formed of a fourth lens element $L_4$ having a biconcave shape with surfaces of different curvature and its surface of greater curvature on the image side intimately bonded to a fifth lens element $L_5$ having a biconvex lens shape and surfaces of different curvature, with its surface of greater curvature on its object side.

The third lens group G3 is formed of a sixth lens element $L_6$ having negative refractive power and a meniscus lens shape with its concave surface on the object side.

Both lens surfaces of the third lens element $L_3$ are aspheric, and the aspheric shapes are prescribed by Equation (A) above using only non-zero aspheric coefficients having even-numbered values of i. Thus, only even-numbered powers of Y help determine the shape of the aspheric lens surfaces of the third lens element $L_3$.

Embodiment 3 also differs from Embodiment 1 in its lens element configuration by different radii of curvature of the lens surfaces, different eccentricities and aspheric coefficients of the aspheric lens surfaces, different optical element surface spacings, and some different refractive indexes and Abbe numbers of the materials of lens elements.

By using lens elements of prescribed shapes, including aspheric lens elements $L_1$ and $L_3$ as described above, the three-group zoom lens of Embodiment 3 achieves high resolution with favorable aberration correction while maintaining a compact, six lens element construction.

Table 11 below lists the surface number #, in order from the object side, the radius of curvature R (in mm) of each surface near the optical axis, the on-axis surface spacing D (in mm) between surfaces, as well as the refractive index $N_d$ and the Abbe number $v_d$ (both at the d-line of 587.6 nm) of each lens element for Embodiment 3. Listed in the bottom portion of Table 11 are the focal length f and the f-number $F_{NO}$ at the wide-angle and telephoto ends, and the maximum field angle 2ω at the wide-angle end and the telephoto end for Embodiment 3.

TABLE 11 f = 5.76–16.13 mm $F_{NO}$ = 2.9–4.8 2ω = 62.2°–23.2°

| # | R | D | $N_d$ | $v_d$ |
|---|---|---|---|---|
| 1* | −77.8625 | 1.20 | 1.50869 | 56.0 |
| 2* | 4.6904 | 4.19 | | |
| 3 | 9.3491 | 2.30 | 1.76182 | 26.5 |
| 4 | 13.1830 | $D_4$ (variable) | | |
| 5 | ∞ (stop) | 0.30 | | |
| 6* | 6.7143 | 2.95 | 1.50869 | 56.0 |
| 7* | −19.4875 | 1.25 | | |
| 8 | −187.9980 | 1.04 | 1.83400 | 37.2 |
| 9 | 4.9330 | 3.59 | 1.51633 | 64.1 |
| 10 | −10.0411 | 3.47 | | |
| 11 | −12.3476 | 1.03 | 1.50869 | 56.0 |
| 12 | −15.3094 | $D_{12}$ (variable) | | |
| 13 | ∞ | 1.75 | 1.51680 | 64.2 |
| 14 | ∞ | | | |

The lens surfaces with a * to the right of the surface number in Table 11 are aspheric lens surfaces, and the aspheric surface shape of these lens elements is expressed by Equation (A) above.

Table 12 below lists the values of the constants K and $A_3$–$A_{10}$ used in Equation (A) above for each of the aspheric lens surfaces (#1 and #2) of lens element $L_1$ of Table 11 and Table 13 below lists the values of the constants K, $A_4$, $A_6$, $A_8$, and $A_{10}$ used in Equation (A) above for each of the aspheric lens surfaces (#6 and #7) of lens element $L_3$ of Table 11. Aspheric coefficients that are not present in Tables 12 and 13 are zero. An "E" in the data indicates that the number following the "E" is the exponent to the base 10. For example, "1.0E-2" represents the number 1.0×10$^{-2}$.

TABLE 12

| Aspheric Factor | #1 | #2 |
|---|---|---|
| K | 24.07997 | −0.31638 |
| $A_3$ | 0.6964052E−3 | 0.6740893E−3 |
| $A_4$ | 0.8066175E−4 | 0.9554210E−3 |
| $A_5$ | 0.1501386E−5 | −0.1501880E−4 |
| $A_6$ | −0.5010894E−5 | 0.5185462E−6 |
| $A_7$ | 0.3349340E−6 | 0.1819851E−5 |
| $A_8$ | 0.4924292E−7 | −0.6694942E−6 |
| $A_9$ | −0.7307155E−8 | 0.1659582E−7 |
| $A_{10}$ | 0.3668512E−9 | 0.8524903E−8 |

TABLE 13

| # | K | $A_4$ | $A_6$ | $A_8$ | $A_{10}$ |
|---|---|---|---|---|---|
| 6 | 0.376671 | −0.6808610E−4 | −0.5381899E−5 | −0.4454396E−6 | −0.1976232E−7 |
| 7 | −26.0101 | −0.2521280E−3 | 0.4946846E−5 | −0.1619543E−5 | 0.2549204E−7 |

In the zoom lens of Embodiment 3, during zooming, lens groups G1 and G2 move to vary their separations and lens group G3 moves with lens group G2. Therefore, the values of the on-axis spacings $D_4$ and $D_{12}$ vary. Table 14 below lists the values of the variables $D_4$ and $D_{12}$ (i.e., the on-axis spacings) at the wide-angle end (Wide), at an intermediate position, and at the telephoto end (Tele). The focal length of the zoom lens when focused at infinity is 5.76 mm at the wide-angle end, 9.21 mm at an intermediate position, and 16.13 mm at the telephoto end.

TABLE 14

| # | Wide | Intermediate | Tele |
|---|---|---|---|
| $D_4$ | 21.74 | 11.02 | 3.36 |
| $D_{12}$ | 7.93 | 11.56 | 18.81 |

Figures 5A, 5B:
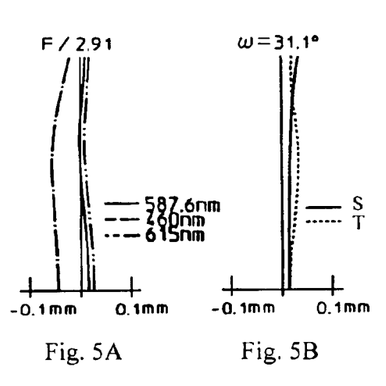
FIGS. 5A–5D show aberrations of the zoom lens according to Embodiment 3 at the wide-angle end.
Figure 5C:
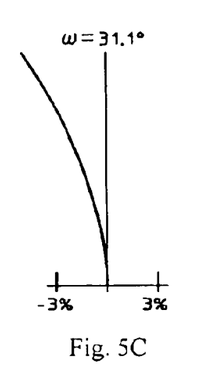
Figure 5D:
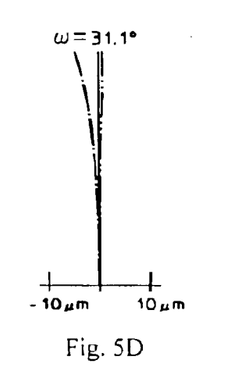
Figures 5E, 5F:
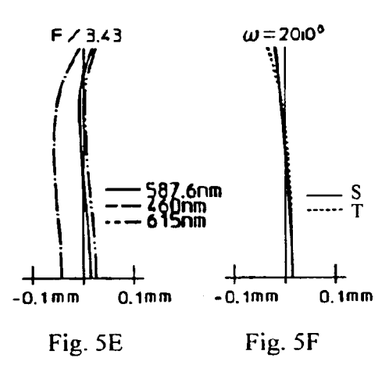
FIGS. 5E–5H show aberrations of the zoom lens according to Embodiment 3 at an intermediate position.
Figure 5G:
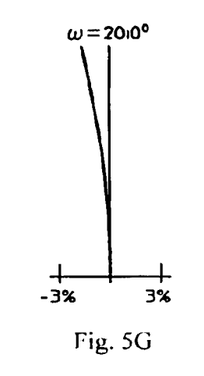
Figure 5H:
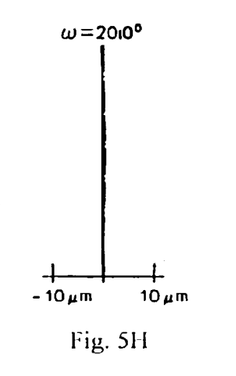
Figures 5I, 5J:
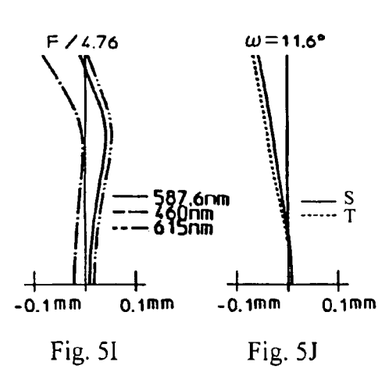
FIGS. 5I–5L show aberrations of the zoom lens according to Embodiment 3 at the telephoto end.
Figure 5K:
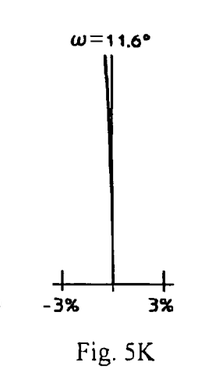
Figure 5L:
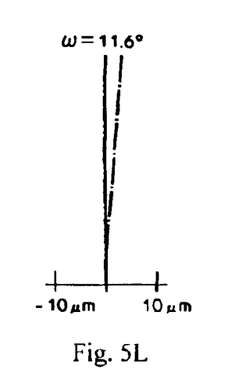

FIGS. 5A–5D show the spherical aberration, astigmatism, distortion, and lateral color, respectively, of the zoom lens of Embodiment 3 at the wide-angle end. FIGS. 5E–5H show the spherical aberration, astigmatism, distortion, and lateral color, respectively, of the zoom lens of Embodiment 3 at an intermediate position, and FIGS. 5I–5L show the spherical aberration, astigmatism, distortion, and lateral color, respectively, of the zoom lens of Embodiment 3 at the telephoto end. In FIGS. 5A, 5E, and 5I, the spherical aberration is shown for the wavelengths 587.6 nm (the d-line), 460.0 nm, and 615.0 nm. In the remaining figures, ω is the half-field angle. In FIGS. 5B, 5F and 5J, the astigmatism is shown for the sagittal image surface S and the tangential image surface T. In FIGS. 5C, 5G and 5K, distortion is measured at 587.6 nm (the d-line). In FIGS. 5D, 5H and 5L, the lateral color is shown for the wavelengths 460.0 nm and 615.0 nm relative to 587.6 m (the d-line). As is apparent from these figures, the various aberrations are favorably corrected over the entire range of zoom.

The present invention is not limited to the aforementioned embodiments, as it will be obvious that various alternative implementations are possible. For example, the number of lens elements and lens components, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Additionally, the number and the shapes of the lens elements and lens components may be varied. Furthermore, in applying Equation (A) above, other aspheric coefficients than those shown in Embodiments 1–3 may be non-zero so that other powers of Y than those described in Embodiments 1–3 may help determine the aspheric shape of one or more aspheric lens surfaces. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens formed of only three lens groups, arranged along an optical axis in order from the object side, as follows:
   a first lens group of negative refractive power;
   a second lens group of positive refractive power; and
   a third lens group of negative or positive refractive power;
   wherein
   the first and the second lens groups are moved so that the first and second lens groups become closer together during zooming from the wide-angle end to the telephoto end;

the first lens group includes at least one lens element that includes at least one aspheric lens surface; and the shape of said at least one aspheric lens surface is given by an aspheric lens equation that includes at least one non-zero coefficient of an even power of Y, and at least one non-zero coefficient of an odd power of Y, where Y is the distance of a point on the aspheric lens surface from the optical axis.

2. The zoom lens of claim 1, wherein:

the third lens group has positive refractive power;

the second and third lens groups become farther apart during zooming from the wide-angle end to the telephoto end;

the second lens group includes a stop for controlling the amount of light that passes through the zoom lens; and the third lens group is moved toward the object side while focusing from infinity to a near point.

3. The zoom lens of claim 2, wherein:

the second lens group includes, arranged along the optical axis in order from the object side, a lens component formed of a first lens element having a biconvex lens shape and a second lens element having a biconcave lens shape that is intimately bonded to the first lens element;

the third lens group has positive refractive power;

wherein the following conditions are satisfied:

$$d/fw < 0.15$$

$$vL_3 - vL_4 > 15$$

where d is the on-axis spacing between the image-side lens surface of the biconcave lens element in the second lens group and the lens element having positive refractive power and a meniscus shape in the second lens group;

fw is the focal length of the zoom lens at the wide-angle end;

$vL_3$ is the Abbe number of the biconvex lens element of the second lens group, and $vL_4$ is the Abbe number of the biconcave lens element of the second lens group.

4. The zoom lens of claim 1, wherein:

the second lens group includes, arranged along the optical axis in order from the object side, a first lens element, a second lens element having a biconcave lens shape that is intimately bonded to said first lens element so as to form a first lens component, and a second lens component; and each of an image-side edge portion of said second lens element and an object-side edge portion of said second lens component includes a flat surface and the flat surfaces are parallel and in contact with each other, or each flat surface is parallel and in contact with one of two opposite parallel sides of a plate that separates said second lens element from said second lens component.

5. The zoom lens of claim 4, wherein said second lens component consists of a lens element.

6. The zoom lens of claim 1, wherein:

the first lens group includes, arranged along the optical axis in order from the object side, a first lens component of negative refractive power, and a second lens component of positive refractive power;

the second lens group includes a stop for controlling the amount of light that passes through the zoom lens;

the second and third lens groups remain the same distance apart during zooming from the wide-angle end to the telephoto end; and the third lens group is moved toward the object side during focusing from infinity to a near point.

7. The zoom lens of claim 6, wherein each of said first lens component and said second lens component consists of a lens element.

8. A zoom lens formed of only three lens groups, arranged along an optical axis in order from the object side, as follows:

a first lens group of negative refractive power;

a second lens group of positive refractive power; and a third lens group of negative or positive refractive power;

wherein the first and the second lens groups are moved so that the first and second lens groups become closer together during zooming from the wide-angle end to the telephoto end;

the first lens group includes at least one lens element that includes at least one aspheric lens surface; and the shape of said at least one aspheric lens surface is given by an aspheric lens equation that includes at least one non-zero coefficient of an even power of Y, with said even power of Y being less than $Y^{16}$ and at least one non-zero coefficient of $Y^i$, where i is an even number of 16 or greater, and Y is the distance of a point on the aspheric lens surface from the optical axis.

9. The zoom lens of claim 8, wherein:

the third lens group has positive refractive power;

the second and third lens groups become farther apart during zooming from the wide-angle end to the telephoto end;

the second lens group includes a stop for controlling the amount of light that passes through the zoom lens; and the third lens group is moved toward the object side during focusing from infinity to a near point.

10. The zoom lens of claim 9, wherein:

the second lens group includes, arranged along the optical axis in order from the object side, a lens component formed of a first lens element having a biconvex lens shape and a second lens element having a biconcave lens shape that is intimately bonded to the first lens element; and the following conditions are satisfied:

$$d/fw < 0.15$$

$$vL_3 - vL_4 > 15$$

where d is the on-axis spacing between the image-side lens surface of the biconcave lens element in the second lens group and the lens element having positive refractive power and a meniscus shape in the second lens group;

fw is the focal length of the zoom lens at the wide-angle end;

$vL_3$ is the Abbe number of the biconvex lens element in the second lens group, and $vL_4$ is the Abbe number of the biconcave lens element in the second lens group.

11. The zoom lens of claim 8, wherein:

the second lens group includes, arranged along the optical axis in order from the object side, a first lens element, a second lens element having a biconcave lens shape that is intimately bonded to said first lens element to form a first lens component, and a second lens component; and each of an image-side edge portion of said second lens element and an object-side edge portion of said second lens component includes a flat surface and the flat surfaces are parallel and in contact with each other, or each flat surface is parallel and in contact with one of two opposite parallel sides of a plate that separates said second lens element from said second lens component.

12. The zoom lens of claim 11, wherein said second lens component consists of a lens element.

13. The zoom lens of claim 8, wherein:

the first lens group includes, arranged along the optical axis in order from the object side, a first lens component of negative refractive power, and a second lens component of positive refractive power;

the second lens group includes a stop for controlling the amount of light that passes through the zoom lens;

the second and third lens groups remain the same distance apart during zooming from the wide-angle end to the telephoto end; and the third lens group is moved toward the object side during focusing from infinity to a near point.

14. The zoom lens of claim 13, wherein each of said first lens component and said second lens component consists of a lens element.

* * * * *

UNITED STATES PATENT AND TRADEMARK OFFICE
CERTIFICATE OF CORRECTION

PATENT NO.   : 6,943,960 B2
DATED        : September 13, 2005
INVENTOR(S)  : Ori et al.

It is certified that error appears in the above-identified patent and that said Letters Patent is hereby corrected as shown below:

Column 7,
Line 38, change "bottom" to -- top --;

Column 8,
Line 40, change "focused at" to -- focused at infinity --;

Column 9,
Line 54, change "bottom" to -- top --;

Column 11,
Line 33, change "re+spectively" to -- respectively --;

Column 12,
Line 63, change "bottom" to -- top --;

Column 14,
Line 24, change "587.6 m" to -- 587.6 nm --.

Signed and Sealed this

Twentieth Day of December, 2005

JON W. DUDAS
*Director of the United States Patent and Trademark Office*